United States Patent [19]

Mazzoni et al.

[11] 4,109,431
[45] Aug. 29, 1978

[54] SEALING AND SPACING UNIT FOR MULTIPLE GLAZED WINDOWS

[75] Inventors: Renato J. Mazzoni, Tarentum; George H. Bowser, New Kensington, both of Pa.

[73] Assignee: PPG Industries, Inc., Pittsburgh, Pa.

[21] Appl. No.: 454,337

[22] Filed: Mar. 25, 1974

[51] Int. Cl.² .............................................. E06B 3/66
[52] U.S. Cl. ...................................... 52/172; 52/400; 260/888; 428/34
[58] Field of Search .......................... 52/172, 398–400, 52/616; 428/34

[56] References Cited

U.S. PATENT DOCUMENTS

| | | | |
|---|---|---|---|
| 2,348,307 | 5/1944 | Richardson | 52/616 |
| 2,974,377 | 3/1961 | Kunkle | 52/616 |
| 3,105,274 | 10/1963 | Armstrong | 52/616 |
| 3,283,890 | 11/1966 | Morris | 161/181 |
| 3,657,900 | 4/1972 | Bowser | 52/616 |
| 3,733,237 | 5/1973 | Wolff | 52/172 |
| 3,758,996 | 9/1973 | Bowser | 52/172 |
| 3,791,910 | 2/1974 | Bowser | 52/172 |

FOREIGN PATENT DOCUMENTS 1,117,028  6/1968  United Kingdom ................ 52/172

OTHER PUBLICATIONS

Handbook of Adhesives by Skeist published by Reinhold Co., 1962, pp. 447–451.

*Primary Examiner*—John E. Murtagh
*Attorney, Agent, or Firm*—Donald Carl Lepiane

[57] ABSTRACT

A novel sealing and spacing unit for multiple glazed windows, and multiple glazed windows employing such a sealing and spacing unit, are disclosed. The sealing and spacing unit comprises a flexible, moisture-impervious base such as a strip of aluminum foil. Disposed on the base in a lengthwise manner is an elongated, flexible, dehydrator strip which comprises a particulate desiccant such as a crystalline zeolite dispersed throughout a moisture-permeable, elastic, polymeric matrix, such as an ethylene-ethyl acrylate copolymer. The dehydrator strip is secured to the base by a thin layer of an adhesive such as an ethylene acrylic acid copolymer hot melt adhesive. Also disposed on the base in a lengthwise manner are two strips of a cold flowable, moisture resistant, mastic, sealant composition. The strips are preferably spaced slightly apart from, and are positioned on both sides of the adhesively secured dehydrator strip. Preferably, the cold flowable, mastic, sealant composition is an admixture of polybutene and two different molecular weight polyisobutylenes.

2 Claims, 4 Drawing Figures

SEALING AND SPACING UNIT FOR MULTIPLE GLAZED WINDOWS

BACKGROUND OF THE INVENTION

1. Field of the Invention

This invention relates to multiple glazed window units and also relates to sealing and spacing means for such units. In another aspect, the invention further relates to the use of a specific cold flowable, mastic, sealant composition in combination with an elongated, flexible, dehydrator strip adhesively secured to foil strip member.

2. Brief Description of the Prior Art

U.S. Pat. Nos. 3,657,900 and 3,699,785, both to Bowser et al., disclose sealing and spacing means for multiple glazed windows. The sealing and spacing means consists of flexible carrier strips such as aluminum foil, and adhered to one side of the carrier strip is an elongated ribbon of sealant material and an elongated resilient spacer-dehydrator element secured to the carrier strip through the sealant. The carrier strip is slightly wider than the ribbon of sealant and the sealant wider than the spacer-dehydrator element. Each of the three elements are coextensive in length and symmetrically disposed on either side of a centerline through the length of the composite element. Examples of suitable sealant compositions are butyl rubber-based sealants, such as are disclosed in U.S. Pat. No. 2,974,377 to Kunkle.

U.S. Pat. Nos. 3,758,996 and 3,791,910, both to Bowser, disclose similar sealing and spacing means for multiple glazed windows and also disclose that the sealant composition can be a hot melt adhesive. Also, U.S. Pat. No. 3,791,910 discloses that the sealant composition can be a cold flowable, butyl rubber-based sealant composition.

Although the above-mentioned sealing and spacing means provide definite advantages in fabricating multiple glazed windows, there are certain shortcomings associated with these sealing and spacing means. As mentioned in both the U.S. Pat. Nos. 3,657,900 and 3,699,785, the butyl sealants, although providing airtight, durable seals, are not particularly good adhesives. When the composite element is coiled for packaging and shipping with the spacer-dehydrator element nearest the core of the coil, the spacer-dehydrator element moves relative to the sealant causing the spacer-dehydrator to assume a wavy or undulatory appearance. The butyl sealant does not have sufficient adhesive properties to hold the spacer-dehydrator element to the carrier tape in a straight line alignment. When the sealing and spacing unit is removed from the package and unrolled, the wavy spacer-dehydrator can only be straightened with difficulty. Also, when the sealing and spacing unit of the prior art is applied to spaced-apart glass sheets and bent around 90° corners at the ends of the sheets, the mastic will not adequately secure a spacer-dehydrator to the carrier tape and the spacer-dehydrator will "bunch together" putting stress on the corners of the multiple glazed window and at times permitting the bunched spacer-dehydrator to extend into the viewing area. To avoid this problem, a notch of the spacer-dehydrator element must be removed from the corner areas of the composite element.

The above problems can be overcome if the sealant composition is one which has strong adhesive and cohesive properties, thereby firmly securing the spacer-dehydrator element to the carrier strip and preventing it from undulating when a composite strip is coiled for packaging or bent around 90° corners in multiple glazed windows. In the aforementioned patents, U.S. Pat. Nos. 3,758,996 and 3,791,910, a hot melt adhesive is recommended for the sealant compositions. Hot melt adhesives have very strong adhesive and cohesive properties making them attractive candidates for securing the spacer-dehydrator to the carrier strip. Unfortunately, hot melt adhesives have a number of shortcomings associated with them for use in sealing multiple glazed window units. First of all, the hot melt adhesives are not nearly as good sealants as are the butyl rubber-based materials. They are more rigid and are not nearly as durable as butyl rubber-based materials and hot melt adhesives are pervious to moisture vapor. In addition, hot melt adhesives are not cold flowable and are only flowable when heated.

With hot melt adhesives, the composite sealing and spacing element or the glass must be heated so as to cause the hot melt adhesive to flow into hermetically sealing contact with the edges of the glass sheets. Heating either the composite element or the glass presents a definite assembling disadvantage. Further, heating may cause deformation of the flexible spacer-dehydrator element and also may cause unwanted condensation in the interior of the multiple glazed unit upon cooling of the heated member. With the butyl sealants, on the other hand, mere pressure at room temperature is sufficient to cause the sealant to flow into hermetically sealing contact with the edges of the glass sheets. With the cold flowable butyl sealants of U.S. Pat. No. 3,791,910, very light pressure such as from a hand roller is all that is necessary.

From the above consideration of the prior art, it appears that there is a need for an improved sealing and spacing unit for multiple glazed windows.

It is an object of the present invention to provide such a sealing and spacing unit. More specifically, it is an object of the present invention to provide a sealing and spacing unit which comprises an elongated, flexible, moisture-impervious base or ribbon, a sealant and a spacer-dehydrator element which can be applied to the peripheral edges of spaced-apart glass sheets and which will hermetically seal the edges of the glass sheets by merely pressing the unit to the edges of the glass sheets so as to flow the sealant into hermetically sealing contact with the edges of the glass sheets; further, the unit is one in which the spacer-dehydrator element is firmly adhered to the ribbon so that it is maintained in a straight alignment and does not take on a wavy or undulating appearance when the composite unit is coiled for packaging or bent around 90° corners in multiple glazed window units.

It is a further object of the present invention to provide multiple glazed windows employing such a sealing and spacing unit.

It is yet a further object of the present invention to employ a novel, cold flowable, mastic sealant in combination with a carrier strip and a spacer-dehydrator element to form a preferred spacing and sealing unit.

SUMMARY OF THE INVENTION

In accordance with this invention, there is provided a sealing and spacing unit for multiple glazed windows, comprising:

(a) an elongated, moisture-impervious base and disposed on said base in a substantially contiguous lengthwise manner:
  i. an elongated, preformed, dehydrator strip having a preshaped cross-section adapted for insertion between opposed marginal edges of a pair of rigid parallel glass sheets of the multiple glazed unit; said dehydrator strip comprising a moisture vapor transmittable, elastic, polymer matrix having finely divided particles of desiccant material dispersed throughout the matrix; said dehydrator strip being secured to said base through a thin layer of an adhesive,
  ii. strips of cold flowable, moisture resistant, mastic, sealant composition positioned on both sides of said spacer-dehydrator element and preferably being spaced slightly apart from the spacer-dehydrator element.

The invention also provides for a multiple glazed window employing the above sealing and spacing unit.

Further, the invention provides for a novel, cold flowable, mastic, sealant composition used in combination with the flexible, moisture-impervious base and the spacer-dehydrator element secured to the base through a thin layer of an adhesive. The sealant composition comprises the following ingredients:

| Ingredient | Percent by Weight |
|---|---|
| polyisobutylene (viscosity average molecular weight 8,000 to 100,000) | 15 – 50 |
| polyisobutylene (viscosity average molcular weight 8,000 to 10,000) | 10 – 45 |
| polybutene | 20 – 50 |
| carbon black | 10 – 45 |
| silica pigment | 5 – 15 |
| zirconium orthosilicate | 5 – 15 |
| zinc oxide | 0 – 5 |
| gamma-glycidoxy-propyltrimethoxysilane | 0 – 5 |

DETAILED DESCRIPTION

Figure 1:
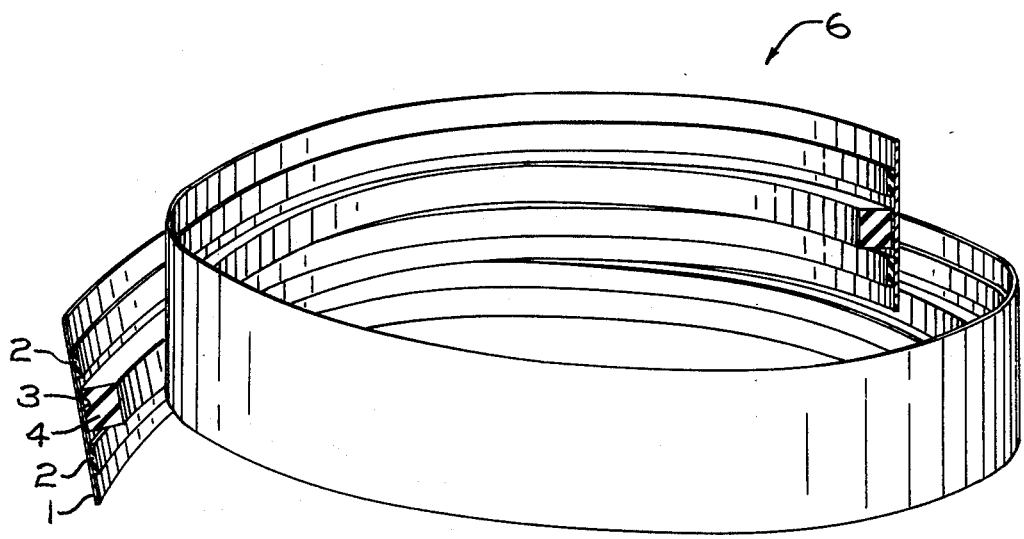
FIG. 1 shows in perspective a coiled strip of the sealing and spacing unit of the present invention.
Figure 4:
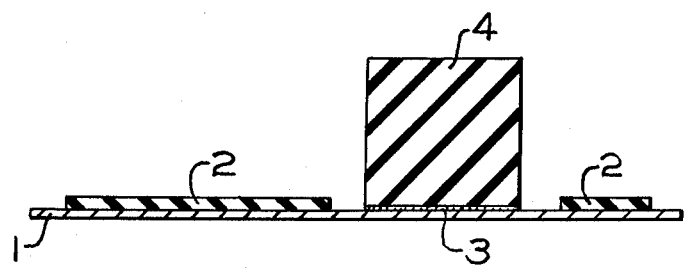
FIG. 4 shows in cross-section an alternate embodiment of the sealing and spacing unit of the present invention.
Figure 2:
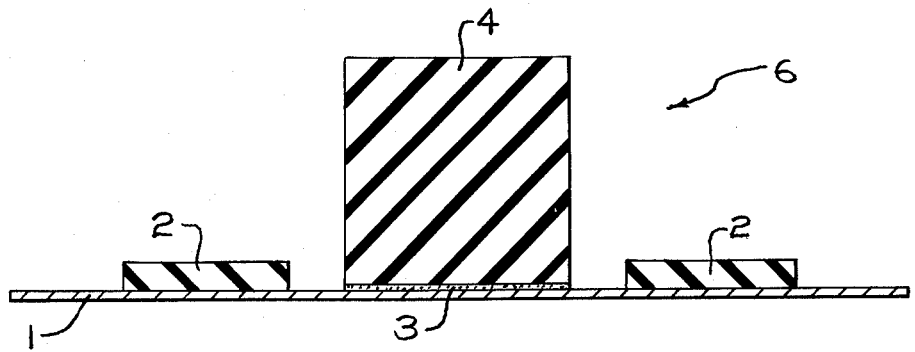
FIG. 2 shows a cross-sectional view of the sealing and spacing unit of the invention.
Figure 3:
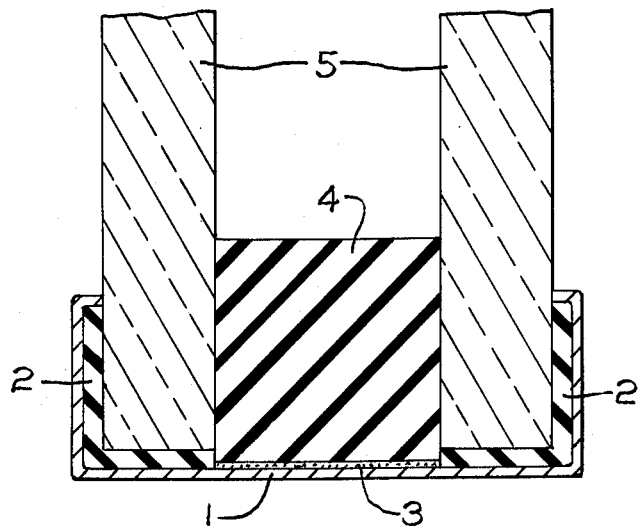
FIG. 3 is a cross-sectional, elevational view of a multiple glazed window employing the sealing and spacing unit of the present invention.

Referring to the Figures, the sealing and spacing unit of the invention 6 comprises an elongated, moisture-impervious, flexible base or ribbon 1 having an elongated, preformed, resilient, dehydrator strip 4 adhered to one side thereof through a thin layer 3 of an adhesive. Spaced on either side of the dehydrator strip 4 and on the same side of tape 1 as the dehydrator strip 4 are two strips 2 of a cold flowable, mastic, sealant composition. In a preferred embodiment of the invention, the strips of cold flowable, mastic sealant are spaced slightly apart from the dehydrator strip, although they could be positioned flush to the dehydrator strip. Also, the mastic sealant strips 2 are approximately equal in width as shown in FIGS. 1 and 3 because the two sheets of glass in the multiple glazed window will probably be of equal width. However, where one of the glass sheets will be much thicker than the other, an unbalanced sealing and spacing unit such as shown in FIG. 4 can be used.

In the construction of multiple glazed windows, such as illustrated in FIG. 3, a continuous length of a spacer-sealant assembly is placed around the periphery of a pair of spaced-apart, generally parallel glass sheets 5 to provide an insulating air space between the sheets. The glass sheets are separated at their marginal edges by the continuous spacer-dehydrator element 4. Hermetic sealing of the insulating air space is accomplished by the moisture-resistant mastic 2 adhering the ribbon 1 to the peripheral edges of the glass sheets completely around the periphery of the window. A hand roller may be conveniently used to press the mastic 2 into sealing contact with the peripheral and/or marginal edges of the glass sheets and any flowing of the mastic that may occur is intended to be concealed by the slightly greater width of carrier tape 1 over the mastic strips 2. Besides the hand roller, an automated mechanical apparatus for hermetically sealing the multiple glazed windows may be used such as is disclosed in U.S. Pat. No. 3,733,237 to Wolff.

For use in the present invention, the carrier ribbon 1 is composed of any moisture-impervious, flexible material. An example would be a 5 to 12 thickness of aluminum foil. Another example would be a strip of flexible, moisture-impervious, plastic material such as polyethylene or polypropylene. Preferred is a 5–12 mil thick strip of aluminum foil which is coated on the interior surface (that is, the same surface on which the dehydrator strip is positioned) with a thin coating, e.g., 0.5 to 5 mils of polyethylene. The interior coating of polyethylene provides for better adhesion of the spacer-dehydrator element to the ribbon 1.

The dehydrator strip 4 is an elongated, preformed strip of elastic, polymeric material and has a preshaped cross-section adapted for insertion between opposed marginal edges of a pair of rigid, parallel sheets of a multiple glazed unit. The dehydrator strip is formed of a moisture vapor transmittable, elastic, polymeric matrix having finely divided particles of desiccant material dispersed throughout the matrix. The spacer-dehydrator element is described in detail in U.S. Pat. No. 3,758,996 to Bowser.

The spacer-dehydrator element 4 is secured to the flexible carrier strip 1 by a thin layer 3, that is, about 1 to 10 mils, of an adhesive. Preferred is a hot melt adhesive. By the term hot melt adhesive is meant a bonding agent which achieves a solid state and resultant strength by cooling, as contrasted with other adhesives which achieve the solid state through evaporation or removal of solvents. Prior to heating, a hot melt adhesive is a thermoplastic, 100 percent solid material, all adhesive. Application of heat brings the material to the liquid state, and after removal of the heat, it sets by simple cooling.

The hot melt adhesive is employed in the practice of the invention mainly because of the economic reasons associated with process speed, simplicity and mechanization. Hot melt adhesives are also used because of the speed in which they produce a bond. In the practice of the invention, economics indicate that the bond between the flexible carrier tape and the spacer-dehydrator element develop very quickly because of packaging considerations. Also, the use of hot melts eliminates the cost of solvents used with solvent-based adhesives. In addition, solvent-based adhesives could not be used in the practice of the invention because the binding mechanism of the solvent-based adhesive depends upon the evaporation of solvent. Solvent evaporation in the proximity of the dehydrator strip could pose problems because of the desiccant contained within the dehydrator. The desiccant may adsorb the solvent vapors and thereby be contaminated with the further possibility of releasing the vapors into the interior space of the multiple glazed unit thereby ruining the appearance of the unit.

Examples of suitable hot melt adhesives include coumarone-indene resins, rosin and its derivatives, mineral, vegetable and petroleum waxes, alkyds, terpene resins, heat-stable phenol-formaldehyde resins.

All of these hot melt adhesives have typically low strength and melt easily to low viscosity fluids. To be converted into useful adhesives, they are reinforced or toughened by blending with limited proportions of high molecular weight polymers selected from the following: ethyl cellulose, polyvinyl acetate and its derivatives, butyl methacrylates, polyethylene, polystyrene, and styrene copolymers such as styrene-butadiene copolymers, and polyisobutylene.

The finished adhesives usually contain, additionally, some proportion of a liquid plasticizer, resinous or monomeric. The natural asphalts and the vegetable and coal-tar pitches also represent base materials useful as hot melt adhesives, alone or in compounds.

The most preferred hot melt adhesives are compounded from polyethylene, polyvinyl acetate and its derivatives and a polyamide derived from dimerized fatty acids and diamines. Particularly preferred hot melt adhesives are ethylene acrylic acid copolymers sold by Union Carbide Corporation under the trade name EAA9300; ethylene vinyl acetate copolymers sold by E. I. du Pont de Nemours and Company (Inc.) under the trademark ELVAX ®; and hot melt adhesives sold by U. S. M. Corporation under the trademark THERMOGRIP ®. See, for example, U.S. Pat. No. 3,283,890 to Morris et al.

The hot melt adhesives are available in many different forms. Some of these are tapes, cords and ribbons, films or thin sheets, granules, pellets and various shapes such as cylinders and cubes and blocks.

The hot melt adhesives employed in the practice of the present invention are non-mastic solids at room temperature and are capable of being stored and handled easily without blocking. Their color is ordinarily light and upon heating they melt sharply and flow freely. Further, the hot melt adhesives of the present invention are stable to prolong heating and able to withstand local overheating. The hot melt adhesives of the present invention should have some flexibility over a fairly wide temperature range that the multiple glazed window would be expected to encounter and use. Accordingly, the hot melt adhesive should have a measure of flexibility over the temperature range of $-30°$ F. to $170°$ F. By flexibility is meant that the hot melt adhesive can withstand the normal working (movement of the components of the multiple glazed unit relative to one another due to differences in thermal expansion coefficients) of the multiple glazed unit over the temperature range of $-30°$ F. to $170°$ F. without cracking. In addition, the hot melt adhesives employed in the invention should firmly secure the elastic, polymeric, spacer-dehydrator element to the elongated base.

In liquid melt form, the hot melt adhesive is applied in bead or ribbon form to a preheated strip of the carrier tape by a nozzle, wheel or spray. Ordinarily, the temperature of application will depend upon the hot melt adhesive selected. Its point of solidification should be such that ample time would be available to close the bond between the carrier tape and the spacer-dehydrator element with only minimal pressure. The bond accomplished with the hot melt adhesive is strong. Accordingly, after the adhesive has cooled and set, the 180° peel strength between the spacer-dehydrator element and the carrier strip should be at least 25 pounds per lineal inch as determined by A.S.T.M. D-903-49T. Ordinarily, with the polymeric matrix materials mentioned in the aforementioned U.S. Pat. No. 3,758,996, the adhesive bond will be stronger than the cohesive strength of the polymeric matrix. Thus, 180° peel strengths between 25 to 40 pounds per lineal inch resulting in cohesive failure of the spacer-dehydrator element usually result.

In general, equipment for applying hot melts is of two principal types: a melt reservoir type and a progressive feed type. In the former, a quantity of the adhesive is melted in a pot and delivered by a metering pump from the pot to a heated nozzle. The hot melt adhesive for this system comes in the form of blocks, chips or granules. A charge is put into the melting pot, heated to a predetermined temperature under thermostatic control, and the melt is fed to a nozzle or cementing wheel by a pump.

In the progressive feed applicator, the adhesive is supplied as a flexible, grooved, cylindrical cord coiled on wheels. The rate of feed of the cord is synchronized with the rate of delivery of the melt through an application nozzle. In between the feed end and the nozzle, the adhesive passes around a heated melt wheel running in an eccentric groove. A melt chamber is formed, in fact, by a small tubular space between the wheel and the casing. The internal capacity of the unit is so small that only a few grams of material are held above the melt temperature within the applicator. The use of thermostatically controlled heating elements located at carefully selected points enables the adhesive to be maintained at its maximum application temperature without overheating. The width of the bonds may be controlled by the design of the nozzle or applying wheel by the relationship between the rate of adhesive output and the speed of the moving aluminum foil.

Besides hot melt adhesives, other adhesives which do not depend on evaporation or removal of solvents for developing the adhesive bond could be used. Examples of suitable alternate adhesives which could be used are those which depend on polymerization or crosslinking of polymer chains for hardening and the development of the adhesive bond. Examples of such adhesive include phenolic and resorcinol resin adhesives and cyanoacrylate adhesives. Such adhesives, like the hot melt adhesive, are non-mastic and solid at room temperature and are not cold flowable. It should be clear that by the term adhesive as used in the specification and claims, a material different from the mastic, cold flowable, sealant composition is intended.

Referring once again to the Figures, the sealant composition 2 is a mastic, cold flowable composition which is air and moisture vapor impervious. By the term moisture vapor impervious is meant that the sealant has moisture vapor transmissions of less than 8 and preferably less than 5 grams/24 hours/square meter/mil at 100° F., 90 percent relative humidity as determined by A.S.T.M. E-96-66, Method E. Examples of suitable cold flowable, mastic, sealant compositions are disclosed in U.S. Pat. No. 3,791,910 to Bowser and U.S. patent application Ser. No. 371,913, filed June 20, 1973, to George H. Bowser, entitled "Sealant." Such sealant compositions are room temperature vulcanizable, butyl rubber-based sealants. As has been mentioned, the above-mentioned sealant compositions are vulcanizable, that is, as they are initially prepared, they are not cured or vulcanized but will only become cured upon prolonged exposure to room temperature or upon a shorter exposure to a higher temperature. Unfortunately, the most expeditious manner of fabricating the sealing and spacing units of the present invention results in vulcanization of the above-mentioned butyl sealants before the sealing and spacing units are applied to the glass edges of the multiple glazed windows. As will be described in more detail later, the vulcanizable butyl sealant is applied to the carrier tape almost simultaneously with the hot melt adhesive. The hot melt adhesive is applied at a temperature between 450° to 475° F. and this heat in such close proximity with the vulcanizable butyl sealant will quickly vulcanize it. Once vulcanized, the butyl sealant does not readily cold flow and high pressure equipment such as clamps, rigid spacers and the like will be required to flow the vulcanized sealant across the edges of the glass of the multiple glazed unit to form a hermetic seal.

Therefore, a non-vulcanizable, cold flowable, moisture resistant, mastic, sealant composition would be desirable in a sealing and spacing unit of the present invention. The sealing composition which has been found to be preferred has the following composition:

| Ingredient | Percent by Weight |
|---|---|
| polyisobutylene (viscosity average molecular weight 75,000 to 125,000) | 15 – 50 |
| polyisobutylene (viscosity average molecular weight 5,000 to 15,000) | 10 – 45 |
| carbon black | 10 – 45 |
| silica pigment | 5 – 15 |
| zirconium orthosilicate | 5 – 15 |
| polybutene | 20 – 50 |
| zinc oxide | 0 – 5 |
| gamma-glycidoxy-propyltrimethoxysilane | 0 – 5 |

The above sealing composition has no curing agent and is non-vulcanizable. It can be applied to the carrier strip before or simultaneously with the hot melt adhesive without danger of premature curing or vulcanization. In fact, if the sealing and spacing unit is to be applied to glass edges of a multiple glazed unit shortly after it is made, the heat from the hot melt adhesive will actually encourage the preferred sealant composition to flow more readily and thus provide for better sealing properties. For a more thorough description of the preferred sealant compositions, see U.S. patent application Ser. No. 454,336 to George H. Bowser, filed even date herewith. The preferred sealant composition disclosed immediately above is the invention of George H. Bowser alone, and although its composition per se is not part of the present invention, the preferred sealant composition in combination with other members of the sealing and spacing unit such as shown in the drawing accompanying the present application is the invention of Renato J. Mazzoni and George H. Bowser.

The sealing and spacing unit 6 such as is shown in the enclosed Figures can be assembled somewhat as follows: A roll of carrier tape 1, such as aluminum foil, is positioned in the beginning of the assembly line and is unrolled, passing beneath a 3½ inch NRM rubber extruder with a split die which extrudes the mastic sealant composition in bead or ribbon form 2 to the edges of the carrier tape 1. Shortly thereafter or simultaneously therewith, the carrier tape with the sealant passes over a bank of radiant heaters to preheat the aluminum foil to an elevated temperature, that is, about 250° to 400° F. Immediately thereafter, the hot melt adhesive 3 is applied to the carrier tape between the two ribbons of mastic sealant composition. The spacer-dehydrator element 4 which is coiled on a roll above the moving strip of foil is then immediately applied with the aid of a roller to the bead hot melt adhesive forming a thin film of hot melt between the carrier tape and the spacer-dehydrator. Optionally, additional rollers further down the assembly line may be used to press the spacer-dehydrator element and carrier strip together to better wet them out with hot melt adhesive. The hot melt is permitted to cure to solidify or set up whereupon it forms a secure bond between the carrier tape and the spacer-dehydrator. The sealing and spacing unit can then be coiled for packaging or applied directly to glass edges of a multiple glazed unit as generally described above.

We claim:

1. A sealing and spacing unit for multiple glazed windows, comprising:

an elongated, flexible, moisture-impervious base;

an elongated, preformed, elastic spacer-dehydrator element having a preshaped cross-section adapted for insertion between opposed marginal edges of a pair of rigid, parallel sheets of a multiple glazed window, said spacer-dehydrator strip comprising a moisture vapor transmittable, polymeric matrix having finely divided particles of desiccant dispersed throughout the matrix;

a thin layer of a non-mastic adhesive which is solid and not cold flowable at room temperature for securing said spacer-dehydrator element to said base in a substantially continuous lengthwise manner; and a strip of cold flowable, mastic, moisture vapor impervious, sealant composition disposed on said base on each side of said spacer-dehydrator element, wherein said mastic sealant composition is of the following composition:

| Ingredient | Percent by Weight |
|---|---|
| polyisobutylene (viscosity average molecular weight 75,000 to 125,000 | 15–50 |
| polyisobutylene (viscosity average molecular weight 5,000 to 15,000) | 10–45 |
| polybutene | 20–50 |
| carbon black | 10–45 |
| silica pigment | 5–15 |
| zirconium orthosilicate | 5–15 |
| zinc oxide | 0–5 |
| gamma-glycidoxy-propyltrimethoxysilane | 0–5 |

2. A multiple glazed window comprising:

two spaced apart glass sheets arranged in generally parallel relation;

a sealing and spacing element circumscribing the perimeter of said glass sheets, spacing them apart from one another and sealing their edges, said sealing and spacing element comprising:

an elongated, flexible moisture-impervious base circumscribing the perimeter of said glass sheets and overlapping their marginal edges;

a preformed, elastic spacer-dehydrator element disposed between opposing surfaces of said sheets adjacent to their peripheral marginal edges, said spacer-dehydrator element being adapted to conform to the shape of the space between, and defined by, said opposing surfaces of said glass sheets to maintain them in spaced relation;

a thin layer of a non-mastic adhesive which is solid and not cold flowable at room temperature for securing said spacer-dehydrator element to said base; and a strip of cold flowable, mastic, moisture vapor impervious, sealant composition disposed on said base on both sides of said spacer-dehydrator element and circumscribing and overlapping peripheral edges of said glass sheets, wherein said mastic sealant has the following composition:

| Ingredient | Percent by Weight |
|---|---|
| polyisobutylene (viscosity average molecular weight 75,000 to 125,000 | 15–50 |
| polyisobutylene (viscosity average molecular weight 5,000 to 15,000) | 10–45 |
| polybutene | 20–50 |
| carbon black | 10–45 |
| silica pigment | 5–15 |
| zirconium orthosilicate | 5–15 |
| zinc oxde | 0–5 |
| gamma-glycidoxy-propyltrimethoxysilane | 0–5 |

* * * * *